March 31, 1931. F. WOODS 1,798,714
RADIO DIRECTION FINDER
Filed May 26, 1925  2 Sheets-Sheet 2

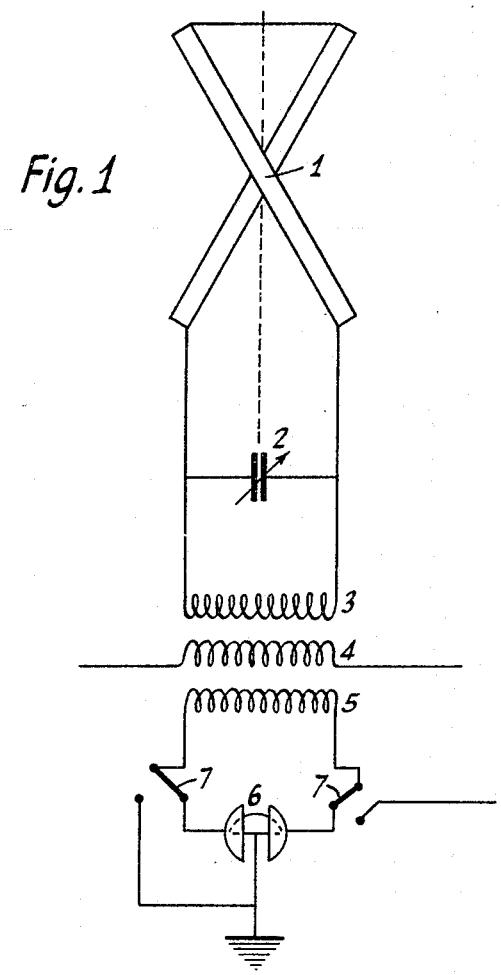
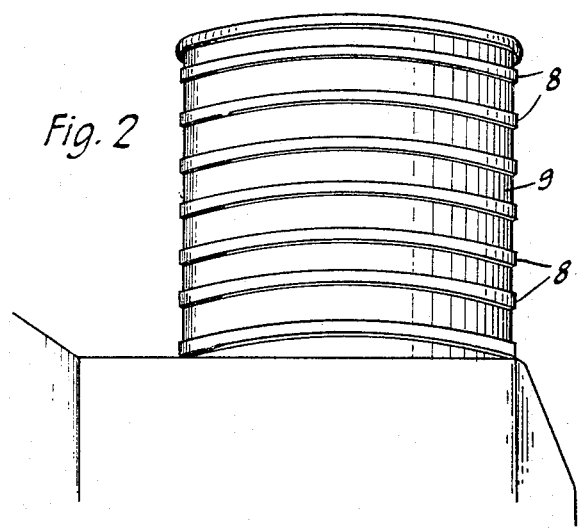

INVENTOR
FRED WOODS
BY
ATTORNEY

Patented Mar. 31, 1931

1,798,714

UNITED STATES PATENT OFFICE

FRED WOODS, OF LIVERPOOL, ENGLAND, ASSIGNOR TO RADIO CORPORATION OF AMERICA, A CORPORATION OF DELAWARE

RADIO DIRECTION FINDER

Application filed May 26, 1925, Serial No. 33,064, and in Great Britain May 28, 1924.

This invention relates to radio direction finders.

The simple frame aerial when installed as, for instance, on board ship, usually has a considerable electrostatic error due to which the reception diagram will be distorted, so that the two zero directions will not be 180° apart as they should be but subtend some other angle.

According to this invention, I provide a balancing circuit by means of which a reverse distortion may be applied to the reception diagram bringing the zero lines to diametrically opposite points.

The aerial, which may be of usual type but preferably consists of two coils fixed at 45° to each other and rotatable as a whole, is shunted by a variable condenser for tuning, and an inductance coil forming one winding of a transformer is connected across the tuning condenser.

A second winding of the transformer is connected to the detector, preferably through an amplifier system.

A third winding of the transformer is connected to the two fixed plates of a three plate variable condenser, and the movable plate of this condenser is connected to earth; this forms the balancing circuit.

By means of a switch the third winding of the transformer may be connected to a vertical aerial to obtain the sense of the direction in the usual way.

The three coils of the transformer are preferably wound so that they are tightly coupled.

The aerial is preferably surrounded with a number of earthed horizontal conducting rings whereby greater accuracy in the readings is obtained.

The aerial may be placed in a wood or other container, especially when intended for shipboard use, and the rings may then be fixed to the outside of the case and connected to each other by an earthed wire, but in some instances the surface leakage of the container may be sufficient to earth the rings.

The quadrantal error in the arrangement previously described may be corrected by also providing a loop aerial having a comparatively few number of turns placed in an athwartship direction and connected to a screened fixed field coil.

A coupling coil mounted so as to be capable of rotation within the screened field coil is mechanically coupled to and rotates in step with the main direction finding aerial coil but in a reverse direction.

This coupling coil is connected so as to induce a supplementary E. M. F. into the amplifier.

A similar arrangement is provided with a coil aerial arranged in a fore and aft direction and the supplementary E. M. F.'s adjusted to correct for the quadrantal error of the main aerial loop.

In some cases one of these auxiliary correcting devices may be omitted.

The accompanying drawings illustrate radio direction finders in accordance with this invention, wherein:

Fig. 1 shows a loop and balancing circuit;

Fig. 2 shows in perspective the preferred form of shielding casing to surround the loop of Fig. 1;

Figure 3:
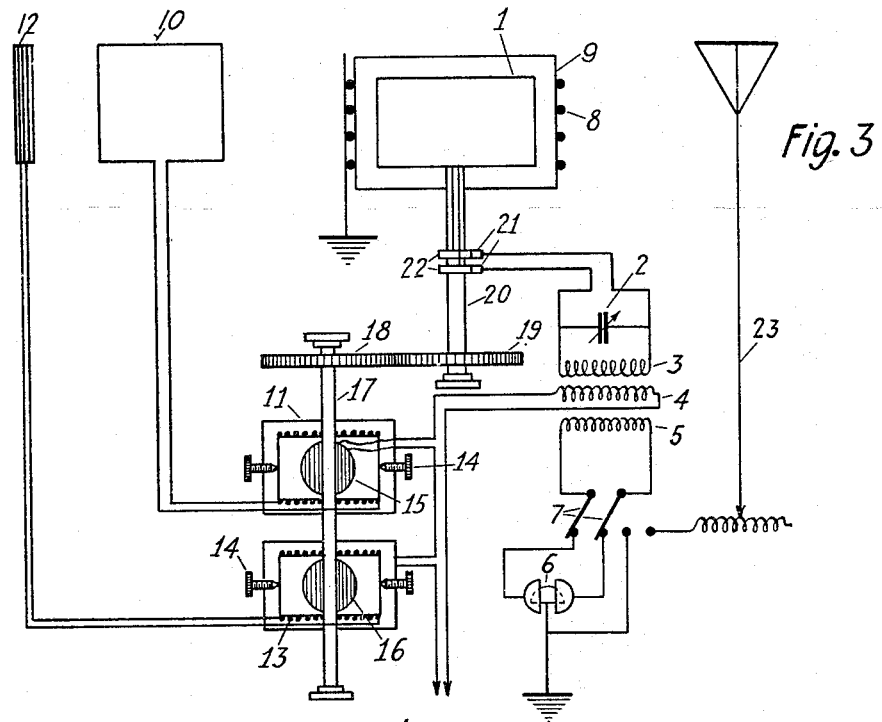
Fig. 3 shows an arrangement similar to Fig. 1 with the addition of a screened field coil and coupling coil; and, Fig. 4 is a modification of Fig. 3 wherein the coupling coil is mounted for rotation within the screened field coil.

Referring to Figure 1, the aerial 1, which consists of two coils, fixed at 45° to each other and rotatable as a whole, is shunted by a variable condenser 2 for tuning, and an inductance coil 3 forming one winding of a transformer is connected across the condenser 2. 4 is a second winding of the transformer which is connected to a detector preferably through an amplifying system (not shown). A third winding 5 of the transformer is connected to the two fixed plates of a three plate variable condenser 8, the movable plate of which is connected to earth; this forms the balancing circuit.

By means of a double pole switch 7, the third winding 5 may be connected to a vertical aerial (not shown) to obtain the sense of the direction in the usual way.

The windings 3, 4 and 5 of the transformer are preferably wound so that they are tightly coupled.

Preferably the aerial 1 is surrounded with a number of earthed horizontal rings, whereby a greater accuracy in the readings is obtained.

Such an arrangement is shown in Figure 2, which is a perspective view, in which horizontal rings 8 are fixed to the outside of a container 9 formed of wood, for example; the rings 8 may be connected to each other by an earthed wire, but in some instance the surface leakage of the container 9 may be found sufficient to earth the rings.

In the arrangement shown in Figure 3, there is provided a loop aerial 10 having a comparatively small number of turns, placed in an athwartship direction and connected to a screened fixed field coil 11. 12 is a similar loop aerial arranged is a fore and aft direction, and connected to a screened fixed field coil 13. The field coils 11, 13 may be adjusted by screws 14. Coupling coils 15, 16 are rotatably mounted within the coils 11, 13 respectively, and are mounted upon a rod 17 fast with a gear wheel 18 in mesh with a gear wheel 19 fast with a rod 20 by which the aerial 1 is rotated, said aerial being enclosed by the container 9, having earthed strips 8 on its exterior. It will be seen that the coupling coils 15, 16 are rotated in step with, but in the reverse direction to, that of the aerial. The coupling coils 15, 16 are connected so as to induce supplementary E. M. F. in the detecting and amplifying circuit.

The circuit comprising condenser 2 and inductance coil 3 is connected to the aerial 1 by brushes 21 and slip rings 22. The vertical aerial for sense reading is indicated at 23.

Figure 4:
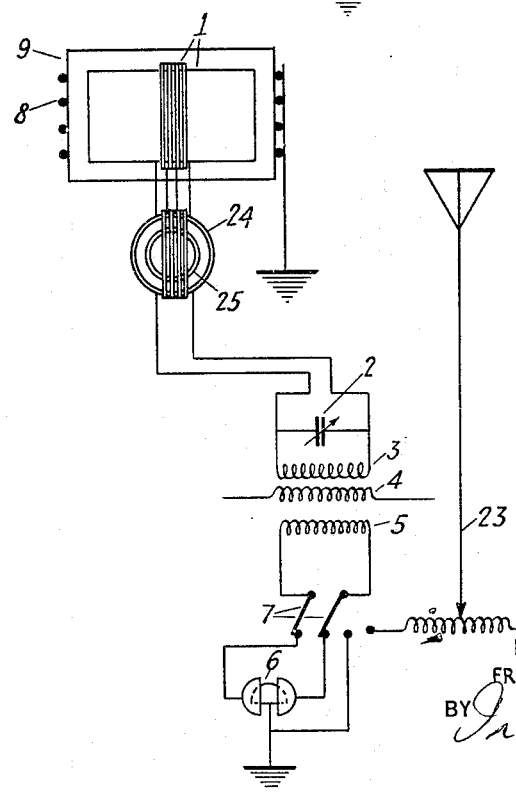

In the arrangement shown in Figure 4, there is provided a fixed aerial 1, comprising two loops at right angle to each other and enclosed within the screened container 9, the loops being connected to the field coils of a radiogoniometer 24, the moving coil 25 of which is connected to the circuit comprising condenser 2 and inductance 3. The arrangement is in all other respects the same as that shown in Figure 1.

Having described my invention, what I claim is:

1. A radio direction finder comprising an aerial, an oscillatory circuit connected thereto, a detecting circuit coupled to said first named circuit, a balancing circuit coupled to said first named circuits, said balancing circuit including an inductance and a variable condenser, a connection between each end of said inductance and a stator member of said condenser, a connection between the rotor of said condenser and the ground, and means including an auxiliary aerial for inducing a supplementary electro-motive force into said detecting circuit.

2. A radio direction finder comprising an aerial, an oscillatory circuit connected thereto, a detecting circuit, a balancing circuit including an inductance and a variable condenser coupled to said detecting circuit, a connection between each end of said inductance and a stator member of said condenser and a connection between the rotor member of said condenser and the ground, and means including an auxiliary aerial system for inducing a supplementary electro-motive force into said detecting circuit, said auxiliary aerial system including a plurality of loops having their planes of maximum reception at right angles to each other.

3. A radio direction finder comprising, a rotatable loop adapted to vary the intensity of the received signal upon being turned, an oscillatory circuit connected thereto, a detecting circuit, a balancing circuit including an inductance and a variable condenser, auxiliary aerial means for inducing a supplementary electromotive force into said detecting circuit, a field coil associated with said auxiliary aerial, a coupling coil rotatably mounted within said field coil, and means for rotating said coupling coil in step with and in opposite direction to the rotation of the means for varying the intensity of the received signals.

4. A radio direction finder comprising an aerial, an oscillatory circuit connected thereto, a detecting circuit coupled to said oscillatory circuit, a compensating circuit tending to bring the zero lines of the reception diagram to diametrically opposite points, said compensating circuit including an auxiliary aerial system coupled to said oscillatory circuit, a balancing circuit coupled to said first named circuits, and shielding means surrounding said aerial whereby greater accuracy of readings may be obtained, said shielding means comprising a plurality of grounded horizontal conductors, said conductors being supported upon a container surrounding said aerial.

5. The combination with a direction aerial of a compensating means including an auxiliary aerial variably coupled to said first mentioned aerial, shielding means including a plurality of rings surrounding said direction aerial and tending to render the zero positions of the directional aerial substantially truly opposite, and gearing means connecting said directional aerial and said auxiliary aerial for simultaneous rotation whereby a compensating electro-motive force whose magnitude is governed by the position of the directional aerial is induced in the directional aerial from the auxiliary aerial.

6. The combination with a directional aerial, of two auxiliary aerials disposed at right angles to each other, each of said auxiliary aerials being variably coupled electrically to said first mentioned aerial and positively coupled mechanically thereto to be rotated thereby to induce therein a correcting electromotive force whose magnitude is governed by the position of said first mentioned aerial.

7. In a directional aerial system, a directional aerial, a receiving circuit associated therewith, an auxiliary aerial, coupling means interposed between the receiving circuit and the auxiliary aerial, and mechanical means actuated by the rotation of the directional aerial to vary the position of the coupling means.

8. In a directional aerial system, a rotatable directional aerial, a receiving circuit associated therewith, an auxiliary aerial associated with said receiving circuit, and a balancing circuit including an inductance and a variable capacity having a stator connected to each end of said inductance and a single grounded rotor associated with said stators.

9. In combination a rotatable directional aerial, a receiving circuit associated therewith, a plurality of auxiliary aerials, variable coupling means interposed between said auxiliary aerials and said receiving circuit, and gearing means actuated by the rotation of said rotatable directional aerial to vary the position of the coupling means.

10. In combination a rotatable directional aerial, a receiving circuit associated therewith, a plurality of auxiliary aerials at right angles to each other, variable coupling means interposed between said rotatable directional aerial and said receiving circuit, and gearing means actuated by the rotation of said rotatable directional aerial to vary the position of the coupling means.

11. In combination a rotatable directional aerial, a receiving circuit, an auxiliary aerial, a field coil in series with said aerial, means for coupling said receiving circuit to said auxiliary aerial including an inductance in said receiving circuit coupled to said field coil, and mechanical means actuated by the rotation of the rotatable directional aerial to vary the amount of coupling between said field coil and said inductance.

12. In combination a rotatable directional aerial, a receiving circuit associated therewith, an auxiliary aerial, a fixed field coil in series with said auxiliary aerial, a rotatable inductance in said receiving circuit coupled to said field coil, and means actuated by said rotatable directional aerial for rotating said rotatable inductance relative to said field coil, and an auxiliary open aerial associated with said receiving circuit.

13. In an aerial receiving system, a directional aerial mounted for rotation on a shaft, a tuned oscillation circuit coupled thereto, a receiving circuit coupled to said oscillation circuit, an auxiliary aerial, an inductance in series therewith, means for coupling said receiving circuit and said auxiliary aerial including a rotatable coil in said receiving circuit associated with said inductance, means for rotating said coil including a shaft connected thereto, gearing means between the directional aerial shaft and the coil shaft, a balancing circuit associated with said receiving circuit comprising a series inductance and capacity grounded at midpoint, and an auxiliary open aerial associated with said receiving circuit.

14. The combination of a rotatable directional aerial, an auxiliary aerial, an inductance connected therewith, a rotatable inductance connected with said directional aerial and coupled to said first named inductance, gearing means connecting said rotatable aerial and said rotatable inductance for mutual rotation, and a detector circuit associated with said directional aerial.

FRED WOODS.